United States Patent
Isoyama (10) Patent No.: US 8,179,918 B2
(45) Date of Patent: May 15, 2012

(54) RELAY CONNECTION UNIT FOR VEHICLE

(75) Inventor: Yoshikazu Isoyama, Yokkaichi (JP)

(73) Assignees: Autonetworks Technoligies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 326 days.

(21) Appl. No.: 12/449,474

(22) PCT Filed: Feb. 18, 2008

(86) PCT No.: PCT/JP2008/052627
§ 371 (c)(1),
(2), (4) Date: Aug. 10, 2009

(87) PCT Pub. No.: WO2008/108156
PCT Pub. Date: Sep. 12, 2008

(65) Prior Publication Data
US 2010/0103859 A1    Apr. 29, 2010

(30) Foreign Application Priority Data
Mar. 6, 2007    (JP) .................... 2007-055344

(51) Int. Cl.
*H04J 3/22*    (2006.01)
(52) U.S. Cl. .................... 370/466; 370/321; 370/442
(58) Field of Classification Search .................. 370/328, 370/331–338, 389, 342, 401–427, 458, 321–327, 370/347–350, 442–444, 498–547, 466–47
See application file for complete search history.

(56) References Cited

U.S. PATENT DOCUMENTS
7,826,479 B2 * 11/2010 Fujimori .................... 370/466
2005/0254518 A1    11/2005 Fujimori
2008/0037504 A1 *  2/2008 Jeon et al. .................... 370/342

FOREIGN PATENT DOCUMENTS
| DE | 10 2005 021 820 A1 | 2/2006 |
| JP | A-2001-036534 | 2/2001 |
| JP | A-2005-328119 | 11/2005 |
| JP | A-2006-287571 | 10/2006 |
| JP | A-2007-110635 | 4/2007 |
| WO | WO 2006/121613 A2 | 11/2006 |

OTHER PUBLICATIONS

Mar. 21, 2011 Office Action issued in German Application No. 11 2008 000 598.02 (with translation).
Dec. 6, 2011 Office Action issued in Japanese Patent Application No. 2007-055344 (with translation).

* cited by examiner

*Primary Examiner* — Pao Sinkantarakorn
*Assistant Examiner* — Iqbal Zaidi
(74) *Attorney, Agent, or Firm* — Oliff & Berridge, PLC (57) ABSTRACT

A relay connection unit which is connected to a first communication line of a first communication protocol for communicating a first message via time-divided slots and a second communication line of a second communication protocol for communicating a second message with the ID and converts the communication protocols to relay the first message and the second message. The relay connection unit is characterized by converting a first storage table in which the ID of the second message is assigned for each time-divided slot for the communication of the first message and the second message into the first message and having processing section for transmitting the converted first message to the first communication line via the time slots assigned in the first storage table.

5 Claims, 8 Drawing Sheets

| Period \ Time slot No. | 1 | 2 | 3 | 4 | 5 | 6 | 7 | 8 |
|---|---|---|---|---|---|---|---|---|
| 1 | 1 | 2 |   |   | 3 | 4 |   |   |
| 2 |   |   | 6 | 5 |   | 4 | 7 | 8 |
| 3 | 1 | 2 |   |   |   | 4 |   |   |
| 4 |   |   |   |   | 3 | 4 |   |   |
| 5 | 1 | 2 | 6 | 5 |   | 4 | 7 | 8 |
| 6 |   |   |   |   |   | 4 |   |   |

Fig. 5B

| ID | Data length | Transmission period (msec) |
|---|---|---|
| 1 | 8 | 2 |
| 2 | 5 | 2 |
| 3 | 8 | 3 |
| 4 | 8 | 1 |
| 5 | 1 | 3 |
| 6 | 8 | 3 |
| 7 | 8 | 3 |
| 8 | 2 | 3 |

[Prior Art]

Fig. 10D
FlexRay frame

Fig. 10C
FlexRay payload

Fig. 10B
CAN relay message

Fig. 10A
CAN message

[Prior Art]

Fig. 11

[Prior Art]

RELAY CONNECTION UNIT FOR VEHICLE

TECHNICAL FIELD

The present invention relates to a relay connection unit mounted on a vehicle and more particularly to a relay connection unit disposed between two communication lines having different communication protocols to relay messages without a time fluctuation such as delay.

BACKGROUND ART

Electric parts such as an engine, a transmission, a brake, an air conditioner, a light, a power window, and the like mounted on a vehicle are controlled by electronic control units (ECUs) which communicate messages with one another via a LAN mounted on the vehicle.

A CAN is widely used as a communication protocol of the LAN mounted on the vehicle. The CAN is of an event-driven type. Thus while a message of other ECU is being communicated through a communication line, one ECU is incapable of sending a message through the communication line. When the communication line is vacant, one ECU is capable of sending the message.

In recent years, with an increase of the ECU mounted on the vehicle, there is an increase in the amount of data to be communicated through the LAN mounted on the vehicle. Thus there is a demand for the development of a protocol which provides a higher communication speed and reliability than the CAN. Such being the case, as a new communication protocol, the FlexRay attracts public attention. The FlexRay is of a time trigger type which allows a message to be sent and received by using a time slot which is time-divided at a predetermined unit time. Each of ECUs connected to the communication line of the FlexRay sends a message at a time slot assigned thereto in advance.

There is a case in which the LAN using the CAN is mounted on a vehicle. Thus in improving the reliability of the LAN mounted on the vehicle and the communication speed thereof by using the FlexRay as the communication protocol, frequently by utilizing the existing LANs, mounted on the vehicle, which use the CAN, the LANs are connected to each other with the communication line of the FlexRay. In this case, it is necessary to relay messages between communication lines using different communication protocols.

Therefore as disclosed in Japanese Patent Application Laid-Open No. 2005-328119 (patent document 1), the communication message conversion apparatus (relay connection unit) is disposed between the communication line using the CAN as the communication protocol thereof and the communication line using the FlexRay as the communication protocol thereof. The communication message conversion apparatus converts messages in conformity to the communication format of each communication protocol and the frame formats of messages.

Figure 9:
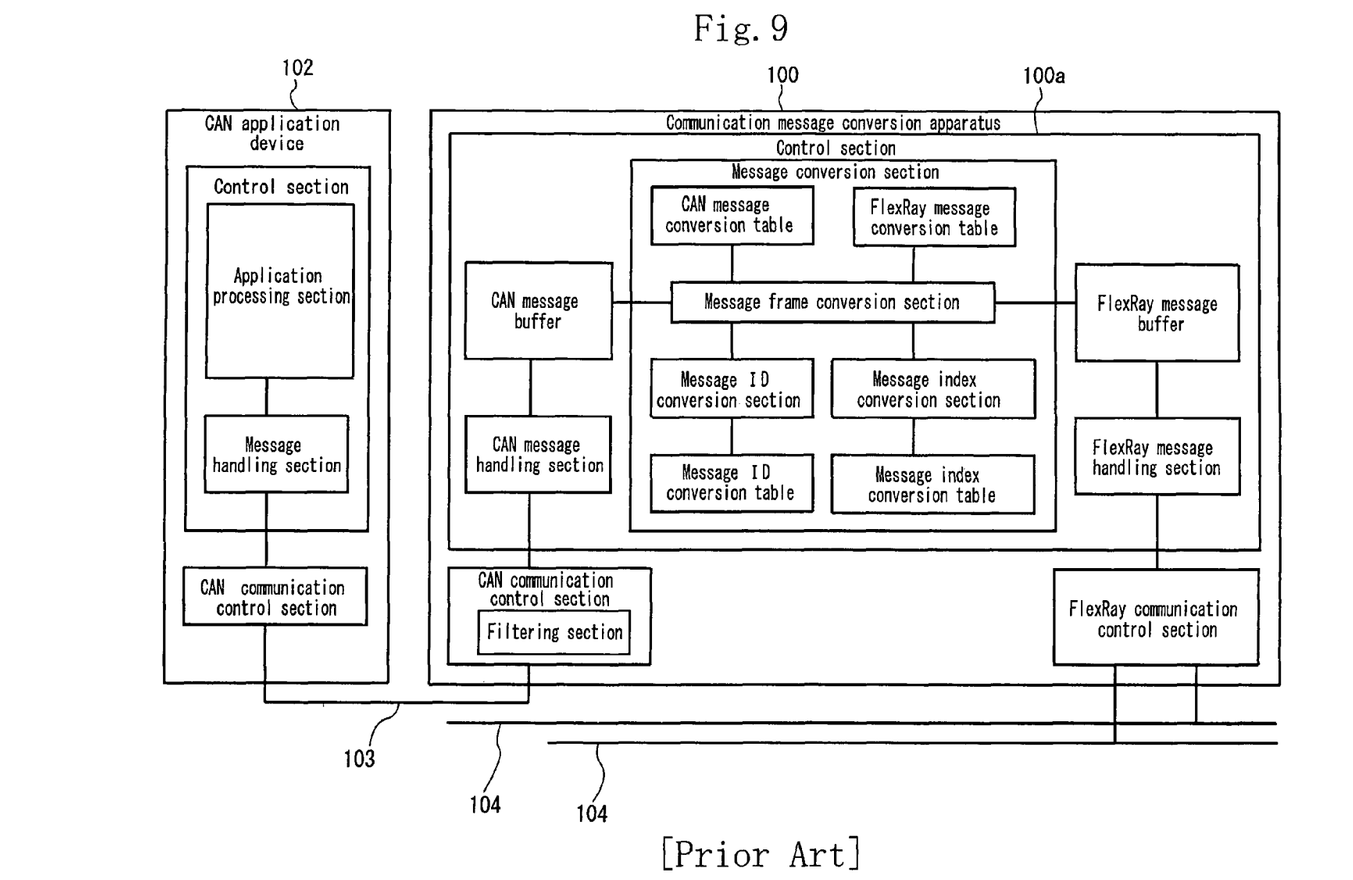
FIG. 9 shows a conventional art.
Figure 10A:
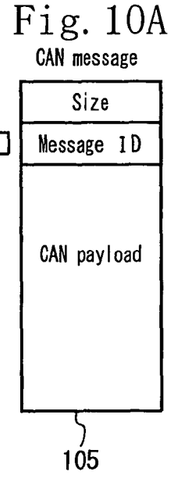
FIG. 10 shows a conventional art.
Figure 10B:
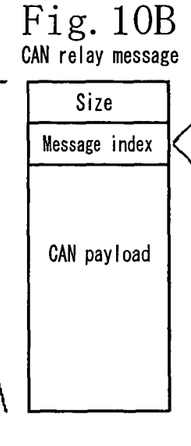
Figure 10C:
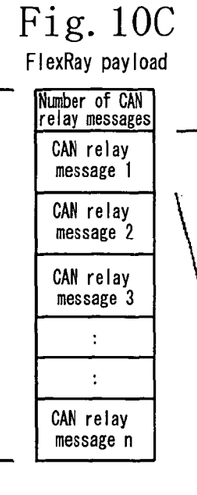
Figure 10D:
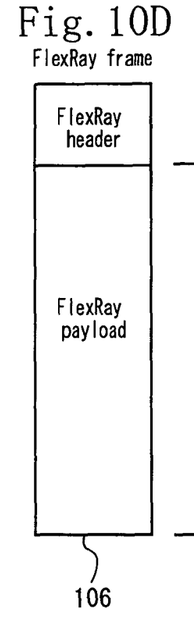

More specifically, as shown in FIG. 9, the CAN communication line 103 to which the ECU 102 is connected and the FlexRay communication line 104 receive and send messages via the communication message conversion apparatus (relay connection unit) 100. As shown in FIG. 10(A), the CAN message 105 having the message size section (control field showing data length), the message ID section (arbitration field indicating ID), and the CAN payload section (data field indicating content of message) is sent to the CAN communication line 103. As shown in FIG. 10(B), after the control section 100a of the relay connection unit 100 which has received the CAN message 105 compresses the message ID section into the message index, as shown in FIG. 10(C), the control section 100a stores a plurality of the CAN messages 105 at the payload section of the FlexRay, and as shown in FIG. 10(D), attaches the header section to the payload section of the FlexRay to obtain the FlexRay message 106. The relay connection unit 100 sends the FlexRay message 106 to the FlexRay communication line 105.

By sending the FlexRay message converted from the CAN message to the FlexRay communication line, the message is relayed between the CAN communication line and the FlexRay communication line having different communication protocols.

In sending a message from the FlexRay communication line to the CAN communication line, the relay connection unit performs an operation reverse to the above-described operation and separates a plurality of the stored FlexRay messages into CAN messages, thus sending them to the CAN communication line.

Figure 11:
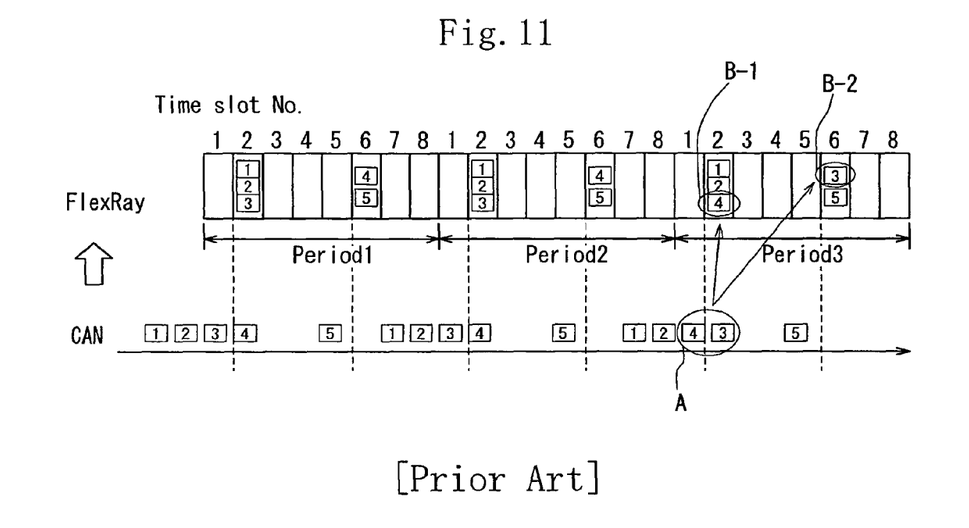
FIG. 11 shows a conventional art.

In sending the message to the FlexRay communication line and receiving the message therefrom in the manner described in the patent document 1, the message is sent and received by using the time slot time-divided at the predetermined unit time, as described above. The time slot at which the relay connection unit is capable of sending the message is predetermined. For example, as shown in FIG. 11, let it be supposed that the relay connection unit is capable of sending a message to the FlexRay communication line at a time slot number "2" and "6". Two CAN messages "4" and "5" received between the time when the message is sent at the slot number "2" and the timing of the slot number "5" are collected into one FlexRay message. The FlexRay message is sent to the FlexRay communication line at the slot number "6".

In the above-described setting, as shown at the portion A of FIG. 11, if the arrival of the CAN message "3" at the relay connection unit delays owing to congestion or the like of the CAN communication line, the CAN message "3" which has been relayed to the FlexRay communication line at the timing of the slot number "2" is relayed at the slot number "6" as shown at the portion B-2. Further the CAN message "4" which has been relayed at the timing of the slot number "6" is relayed at the slot number "2" as shown at the portion B-1. That is, the communication message conversion apparatus 100 has a problem that the arrival of the CAN message at the relay connection unit delays and the order is replaced and thereby the period of the transmission of the CAN message to the FlexRay communication line and the transmission order thereof are not observed, which causes a time fluctuation in the relay of the CAN message.

In the patent document 1, not only the CAN payload section of the CAN message, but also the message ID section and the size section thereof are stored at the payload section of the FlexRay message and sent to the FlexRay communication line. But the message ID section of the CAN message and the size section thereof are unnecessary for sending and receiving the FlexRay message. The communication message conversion apparatus disclosed in the patent document 1 has a problem that unnecessary data is included in the payload section of the FlexRay message.

Patent document 1: Japanese Patent Application Laid-Open No. 2005-328119

DISCLOSURE OF THE INVENTION

Problem to be Solved by the Invention

The present invention has been made in view of the above-described problems. It is an object of the present invention to connect a relay connection unit between two communication lines having different communication protocols to relay messages without a time fluctuation such as delay and decrease data of the messages to be relayed.

Means for Solving the Problem

To solve the above-described problems, the present invention provides a relay connection unit, mounted on a vehicle, which is connected to a first communication line for communicating a first message by using a first communication protocol for communicating a message at time-divided time slots and a second communication line for communicating a second message by using a second communication protocol for communicating a message by attaching an ID (identifier) to the second message. The relay connection unit converts the communication protocols to each other to relay the first message and the second message.

The relay connection unit has a first storage table in which the ID of the second message is assigned to each of the time-divided time slots for communicating the first message; and a processing section for converting the second message received from the second communication line to the first message and sending the first message converted from the second message to the first communication line at the time slots assigned in the first storage table.

As described above, in the relay connection unit of the present invention, the second message received from the second communication line is converted to the first message, and the first message converted from the second message is sent to the first communication line at the time slots assigned in the first storage table.

As described above, in the disclosure of the patent document 1, there is a case in which the first message includes a plurality of the second messages. But in the present invention, the first message always includes one second message. Further based on the ID of the second message, the first message including only one second message is sent to the first communication line at the time slot set in the first storage table.

Therefore even when there is delay in a timing at which the relay connection unit receives the second message or the order of receiving the second message changes, based on the first storage table, the second message having the predetermined ID is sent to the first communication line at the predetermined time slot. Therefore it is possible to observe the predetermined period of the transmission of the second message to the first communication line and prevent a fluctuation of a relay time period required to relay the second message from the second communication line to the first communication line.

Preferably a frame of the first message has a header segment and a payload segment showing a content of the first message; and a frame of the second message has a data field showing a content of the second message, an arbitration field showing the ID thereof, and a control field showing a data length of the data field. In executing communication by converting the second message to the first message, the processing section treats the data field of the second message as the payload segment of the first message and does not include the arbitration field of the second message and the control field thereof in the first message.

As described above, the payload segment of the first message does not include the arbitration field of the second message and the control field thereof. Therefore it is easy to convert the second message to the first message and decrease the payload segment of the first message.

It is preferable that the relay connection unit further includes a second storage table for converting the first message to the second message; that the second storage table stores the data length and a period of transmission of the second message to the second communication line at each of the time slots of the first message; and that the processing section converts the first message received from the first communication line by using the second storage table, and sends the second message converted from the first message to the second communication line, based on the transmission period shown in the second storage table.

As described above, the relay connection unit converts the first message received from the first communication line to the second message and sends the second message to the second communication line at the transmission period read out from the second storage table.

Upon receipt of the first message via the first communication line, the processing section refers to the first storage table. Based on the time slot at which the relay connection unit has received the first message, the processing section reads out the ID of the second message.

Referring to the second storage table and based on the ID of the second message, the processing section reads out the period of the transmission of the second message to the second communication line.

The processing section converts the received first message to the second message and sends the second message to the second communication line in the transmission period shown in the second storage table.

Because the relay connection unit has the second storage table in addition to the first storage table, the relay connection unit is capable of sending the second message to the second communication line at the predetermined transmission period by converting the first message to the second message.

It is preferable that in executing communication by converting the first message to the second message, the processing section treats the payload segment of the first message as the data field of the second message, writes the ID of the second message read out from the first storage table to the arbitration field of the second message, and writes the data length read out from the second storage table to the control field.

The first message converted to the second message does not include the arbitration field showing the ID of the second message and the control field showing the data length thereof. But with reference to the first and the second storage tables, the processing section is capable of reading out the ID of the second message and the data length thereof.

The processing section treats the payload segment of the first message as the data field of the second message, adds the arbitration field and the control field to the data field, and writes the ID and the data length read out from the first and the second storage tables. Thereby the first message can be converted to the second message.

Because the relay connection unit which has received the first message is capable of converting the first message to the second message by using the message ID and the data length shown in the first and the second storage tables, it is unnecessary for the first message to include the arbitration filed showing the ID of the second message and the control field showing the data length thereof.

ECUs and other relay connection units connected to the first communication line send the first message. In the disclosure made in the patent document 1, when the predetermined first message cannot be sent at the predetermined time slot owing to congestion of messages in the ECUs and the relay connection units, there is a case in which the first message is sent at a next time slot.

Therefore when the relay connection unit disclosed in the patent document 1 is incapable of receiving the predetermined first message, the relay connection unit is incapable of immediately judging whether the predetermined first message has not been sent owing to failure of relay or will be sent late at the next time slot.

On the other hand, in the present invention, the first message is sent at the predetermined time slot and thus the time when the first message is sent does not fluctuate. Therefore with reference to the first storage table, the relay connection unit which is to receive the first message is capable of finding which of the first messages has been sent at which of the time slots.

Therefore when the relay connection unit is incapable of receiving the predetermined first message at the predetermined time slot, without waiting for the next time slot, the relay connection unit is capable of detecting that the first message has not been sent.

It is preferable that the communication protocol of the first communication line is FlexRay and that the communication protocol of the second communication line is CAN.

More specifically, one or a plurality of ECUs is connected to each of the first communication line and the second communication line. The relay connection unit of the present invention is preferably used for the transmission of the first and second messages among the ECUs by means of the relay connection unit which converts the communication protocols to each other.

The relay connection unit of the present invention is included in the ECU. That is, the first message sent from other relay connection unit connected to the first communication line is sent to the electronic control unit of the second communication line connected to one relay connection unit, and the second message received from the electronic control unit may be sent to the other relay connection unit connected to the first communication line.

Effect of the Invention

As described above, in the present invention, the first storage table in which the ID of the second message is assigned to each of the time-divided time slots is mounted in the relay connection unit, for relaying the transmission of the first and second messages, which is disposed between the first communication line for communicating the first message by using the first communication protocol for communicating the first message at time-divided time slots and the second communication line for communicating the second message by using the second communication protocol for communicating the second message by attaching the ID (identifier) to the second message. Therefore in sending the first message from the second communication line to the first communication line at the predetermined time slot, it is possible to observe the period of transmission of the first message to the first communication line and prevent a fluctuation of a relay time period required to relay the second message from the second communication line to the first communication line.

DESCRIPTION OF REFERENCE SYMBOLS AND NUMERALS

10: LAN mounted on vehicle
11: FlexRay communication line
12: CAN communication line
20: relay connection unit
21: CAN communication section
22: CAN buffer section
23: processing section
24: storage section
25: FlexRay buffer section
26: FlexRay communication section
m1: first message
m2: second message
TS: time slot
T1: first storage table
T2: second storage table

BEST MODE FOR CARRYING OUT THE INVENTION

The embodiment of the present invention is described below with reference to the drawings.

FIGS. 1 through 8 show a first embodiment of the present invention.

Figure 1:
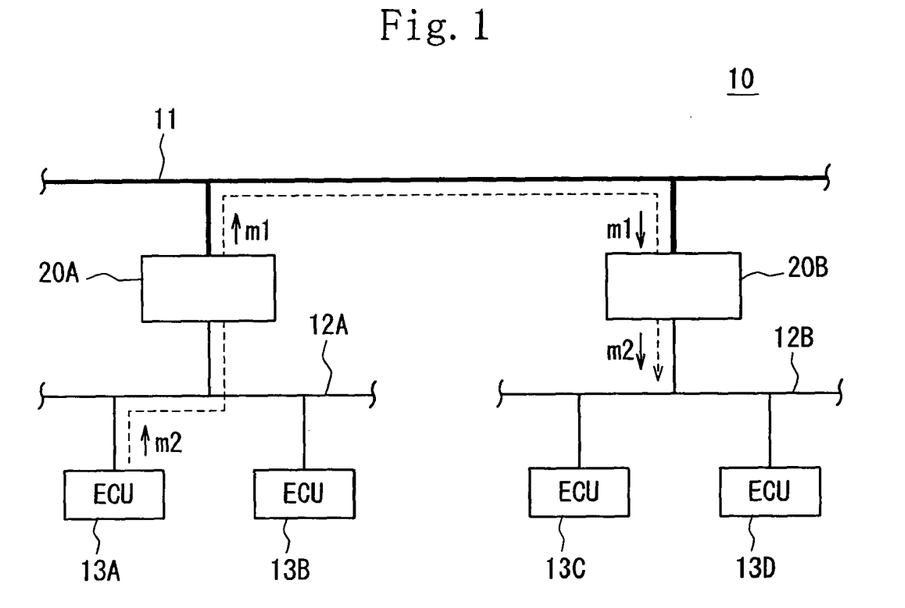
FIG. 1 shows the construction of a LAN, mounted on a vehicle, which has a relay connection unit of the present invention.

In the first embodiment, a relay connection unit 20(20A, 20B) of the present invention is connected to a FlexRay communication line 11 consisting of a first communication line shown with a thick line in FIG. 1, and a plurality of ECUs 13 (ECUs 13A and 13B are connected to relay connection unit 20A, and ECUs 13C and 13D are connected to relay connection unit 20B) is connected to each relay connection unit 20 via a CAN communication line 12(12A,12B) consisting of a second communication line to construct a LAN 10 mounted on a vehicle.

In the LAN 10 mounted on the vehicle, when a message is sent and received between the ECU 13A connected to the relay connection unit 20A and the ECU 13C connected to the relay connection unit 20B, the message is sent from the ECU 13A to the relay connection unit 20A via the CAN communication line 12A, sent from the relay connection unit 20A to the relay connection unit 20B via the FlexRay communication line 11, and sent from the relay connection unit 20B to the ECU 13C via the CAN communication line 12B.

That is, it is necessary for the relay connection unit 20 (20A, 20B) to relay the message by converting a communication protocol of the FlexRay communication line 11 to that of the CAN communication line 12 and vice versa because the communication protocol of the FlexRay communication line 11 and that of the CAN communication line 12 are different from each other.

The FlexRay communication line 11 is a communication line for executing communication by using the communication protocol conforming to the FlexRay. The maximum transmission speed of the FlexRay communication line 11 is 10 Mbps.

The CAN communication line 12 is a communication line for executing communication by using the communication protocol conforming to the CAN. The maximum transmission speed of the CAN communication line 12 is 1 Mbps.

The message the relay connection unit 20 sends and receives via the FlexRay communication line 11 is hereinafter referred to as a first message m1, whereas the message the relay connection unit 20 sends and receives via the CAN communication line 12 is hereinafter referred to as a second message m2.

FIG. 4 shows the first message m1, the second message m2, and the relationship between the first message and a time slot TS.

Figures 3, 4A, 4B:
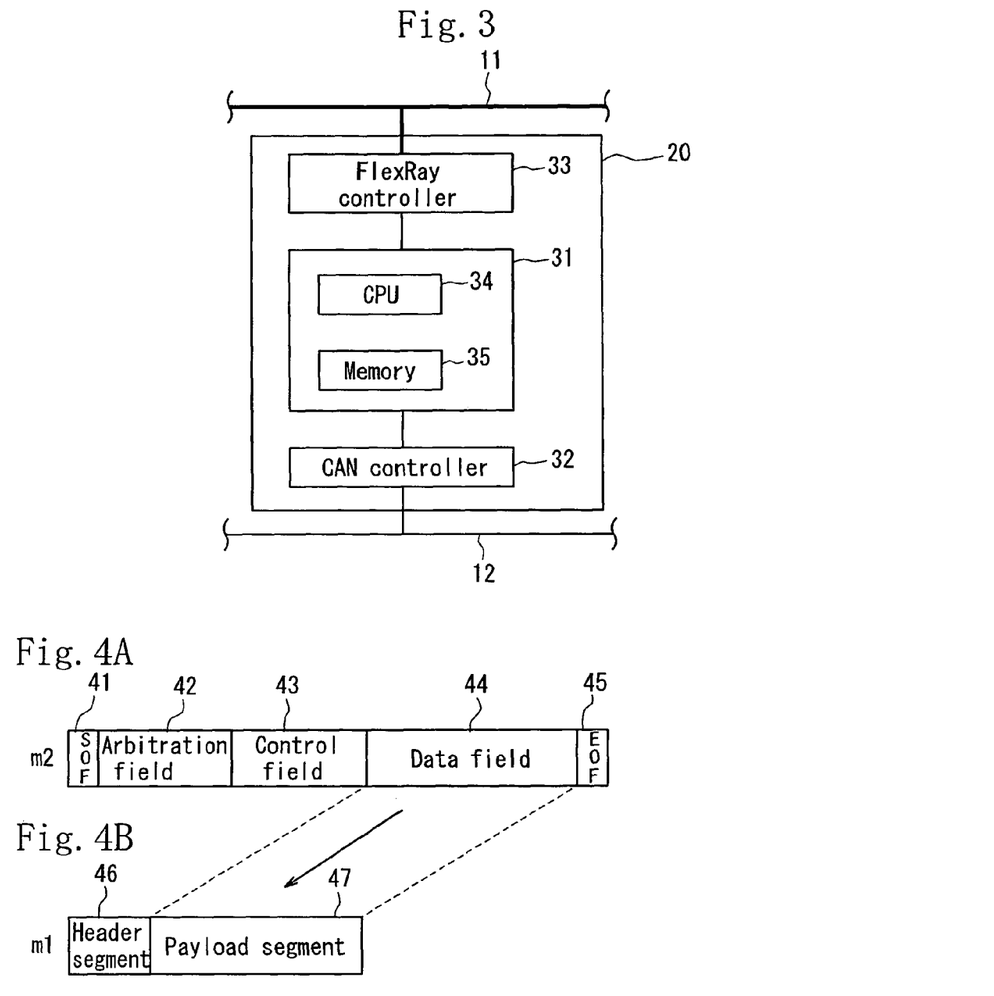
FIG. 3 is a block diagram showing the construction of the relay connection unit.
FIG. 4(A) shows a frame of a second message.
FIG. 4(B) shows a frame of a first message.

FIG. 4(A) shows the frame of the second message m2 sent and received via the CAN communication line 12 and has an SOF 41 showing the start of the frame, an arbitration field 42 showing the ID of the second message m2, a control field 43 showing the data length of a data field 44, the data field 44 showing the content of the message, and an EOF 45 showing the termination of the frame.

FIG. 4(B) shows the frame of the first message m1 sent and received via the FlexRay communication line 11 and has a header segment 46 which is a header portion of the first message m1 and a payload segment 47 showing the content of the message.

Figure 4C:
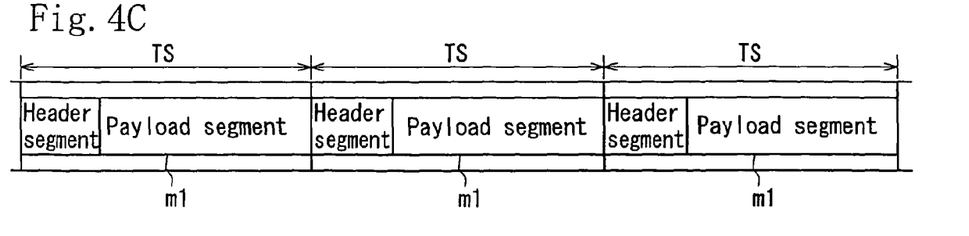
FIG. 4(C) shows the relationship between a time slot and the first message.

FIG. 4(C) shows the relationship between the first message m1 and the time slot TS. As described later, in the relay connection unit 20, the first message m1 including one second message m2 at the payload segment 47 is assigned to one time slot TS.

Figure 2:
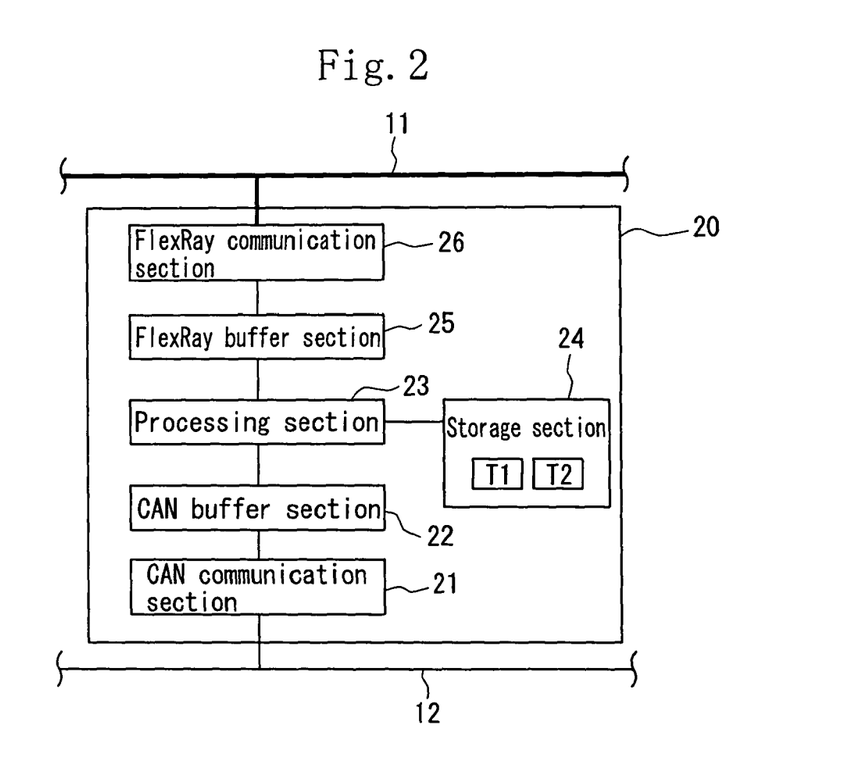
FIG. 2 is a block diagram showing a relay connection unit of a first embodiment.

As shown in FIG. 2, the relay connection unit 20 (20A, 20B) converting the first message m1 to the second message m2 and vice versa has a CAN communication section 21, a CAN buffer section 22, a processing section 23, a storage section 24, a FlexRay buffer section 25, and a FlexRay communication section 26.

More specifically, as shown in FIG. 3, the relay connection unit 20 has a microcomputer 31, a CAN controller 32, and a FlexRay controller 33. The microcomputer 31 has a CPU 34 and a memory 35 having a ROM and a RAM.

The CAN communication section 21 is constructed of the CAN controller 32. The FlexRay communication section 26 is constructed of the FlexRay controller 33.

The processing section 23 is constructed of the CPU 34. The storage section 24 is constructed of the ROM of the memory 35. The FlexRay buffer section 25 and the CAN buffer section 22 are constructed of the RAM of the memory 35.

The storage section 24 has a first storage table T1 referred to in converting the second message to the first message and a second storage table T2 referred to in converting the first message to the second message.

The processing section 23 has a program for executing message conversion processing with reference to the first storage table T1 and the second storage table T2 and data for performing computations, thus executing necessary processing based on the program and the data.

Figure 5A:
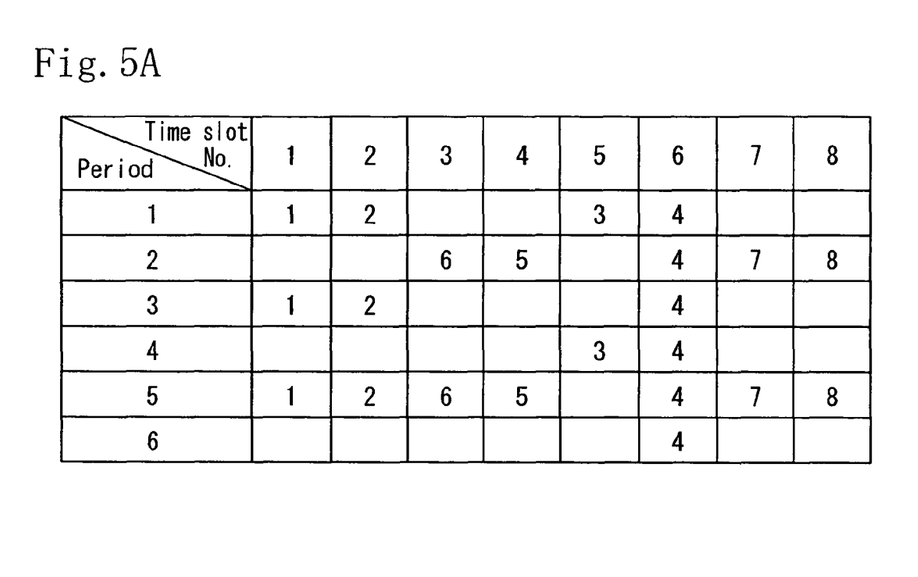
FIG. 5(A) shows an example of a first storage table.

FIG. 5(A) shows an example of the first storage table T1 in which the relationship among a time slot TS number, a period, and an ID of the second message m2 is specified. In the first storage table T1, time slot TS numbers 1 through 8 are set as one period. The first storage table T1 has six periods.

In sending the first message m1 to the FlexRay communication line 11 by converting the second message m2 received from the CAN communication line 12 to the first message m1, the processing section 23 refers to the first storage table T1. Based on the ID of the received second message m2, the processing section 23 judges a period of transmission of the first message m1 to the FlexRay communication line 11 and the time slot TS.

For example, when the ID of the second message m2 cyclically which is to be received from the CAN communication line 12 is "3", the processing section 23 reads out from the first storage table T1 that the first message m1 is to be sent to the FlexRay communication line 11 at a time slot TS number 5 of a first period and a fourth period and converts the second message m2 having "ID3" to the first message m1. When the timing of the time slot TS number 5 of the first period or of the fourth period comes, the relay connection unit 20 sends the first message m1 converted from the second message m2.

That is, the timing at which the relay connection unit 20 relays the first message m1 by converting the second message m2 to the first message m1 is determined based on the first storage table T1 and not based on the timing at which the relay connection unit 20 receives the second message m2.

In sending the second message m2 to the CAN communication line 12 by converting the first message m1 received from the FlexRay communication line 11 to the second message m2, the processing section 23 refers to the first storage table T1. Based on the time slot TS at which the first message m1 is received and a period, the processing section 23 reads out the ID of the second message m2 converted from the first message m1.

Blanks in the first storage table T1 indicate that the relay connection unit 20 does not send the first message m1 to the FlexRay communication line 11 at the time slot TS numbers of the periods. At the blank time slot TS numbers of the periods, other relay connection units 20 connected to the FlexRay communication line 11 and the electronic control units are sending messages or any of the relay connection units is not sending the message.

Figure 5B:
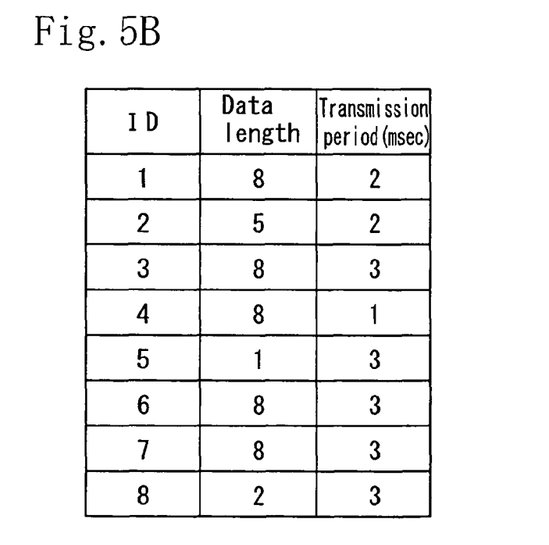
FIG. 5(B) shows an example of a second storage table.

FIG. 5(B) shows an example of the second storage table T2 referred to in sending the second message m2 to the CAN communication line 12 by converting the first message m1 received from the FlexRay communication line 11 to the second message m2. In the second storage table T2, the relationship among the ID of the second message m2, the data length thereof, and the period of the transmission of the second message m2 to the CAN communication line 12 is specified.

With reference to the first storage table T1, initially the processing section 23 reads out the ID of the second message m2 included in the first message m1. Thereafter, the processing section 23 refers to the second storage table T2. Based on the ID of the message, the processing section 23 reads out the data length of the second message m2 and the transmission period thereof.

The processing section 23 converts the first message m1 to the second message m2 and sends the second message m2 to the CAN communication line 12 in each transmission period read out from the second storage table T2.

The CAN communication section 21 of the relay connection unit 20 is connected to the CAN communication line 12 and is thus capable of performing communication of the second message m2 with the CAN communication line 12 by the communication protocol conforming to the CAN. In accordance with a command issued by the processing section 23, the CAN communication section 21 makes the frame of the second message m2, stored in the CAN buffer section 22, which is to be sent to the CAN communication line 12 and sends the second message m2 to the CAN communication line 12 in accordance with the transmission period stored in the second storage table T2 as is described later. The CAN communication section 21 stores the second message m2 received from the CAN communication line 12 at the CAN buffer section 22.

The CAN buffer section 22 temporarily stores the second message m2 received from the CAN communication section 21 and stores the second message m2 to be sent to the CAN communication line 12 until a sending timing comes.

The FlexRay buffer section 25 temporarily stores the first message m1 converted from the second message m2 by the processing section 23 until the time slot TS at which the first message m1 should be sent comes and stores the first message m1 received from the FlexRay communication line 11.

The FlexRay communication section 26 is connected to the FlexRay communication line 11 and is thus capable of performing communication of the first message m1 with the FlexRay communication line 11 by the communication protocol conforming to the FlexRay. In accordance with a command issued by the processing section 23, the FlexRay communication section 26 makes a frame of the first message m1 stored at the FlexRay buffer section 25 and sends the first message m1 to the FlexRay communication line 11 at a predetermined time slot TS. The FlexRay communication section 26 stores the second message m2 received from the FlexRay communication line 11 at the FlexRay buffer section 25.

As described above, the processing section 23 relays the first and second messages m1 and m2 by converting the second message m2 received from the CAN communication line 12 to the first message m1 and by converting the first message m1 received from the FlexRay communication line 11 to the second message m2.

In the communication of the processing section 23 with the FlexRay communication line 11, based on the time-divided time slot TS, the second message m2 converted to the first message m1 can be relayed in the unit period of time of the time slot TS.

The processing section 23 issues a command to the CAN communication section 21 and the FlexRay communication section 26 to the effect that the converted message should be sent to the CAN communication line 12 and the FlexRay communication line 11 at the predetermined time slot TS.

In more detail, the processing section 23 converts the message by treating the data content of the payload segment 47 of the first message m1 and that of the data field 44 of the second message m2 shown in FIG. 4 as the same data content.

In converting the second message m2 to the first message m1, the processing section 23 treats the data field 44 of the second message m2 as the payload segment 47 of the first message m1 of the FlexRay and attaches the header segment 46 of the FlexRay to the payload segment 47 to obtain the first message m1. That is, in the conversion of the message to be executed at the processing section 23, the content of the data field 44 of the second message m2 is moved to the converted payload segment 47 as it is. Therefore the content of the payload segment 47 of the first message m1 is the same as that of the data field 44 of the second message m2.

The data of the data field 44 of the second message m2 is disposed from a high-order bit of the payload segment 47 of the first message m1. Thus supposing that the payload segment 47 of the first message m1 has eight bytes and that the data field 44 is smaller than eight bytes, a residual region is generated in the payload segment 47. Therefore padding processing of writing "0" to the residual region is executed.

In converting the first message m1 to the second message m2, the processing section 23 treats the payload segment 47 of the first message m1 as the data field 44 of the second message m2 and with reference to the first storage table T1 and the second storage table T2, reads out the ID of the second message m2 and the data length thereof, writes them to the arbitration field 42 of the second message m2 and the control field 43 thereof, and attaches them to the data field 44 together with the SOF 41 and EOF 45 to obtain the second message m2.

The operation of the relay connection unit 20 is described below.

Description is made by exemplifying a case in which the ECU 13A connected to the CAN communication line 12A shown in FIG. 1 sends the second message m2 having the ID3, the relay connection unit 20A relays the first message m1 converted from the second message m2 to the FlexRay communication line 11, and the relay connection unit 20B receives the first message m1, converts it to the second message m2, and relays the second message m2 to the CAN communication line 12B.

Figure 6:
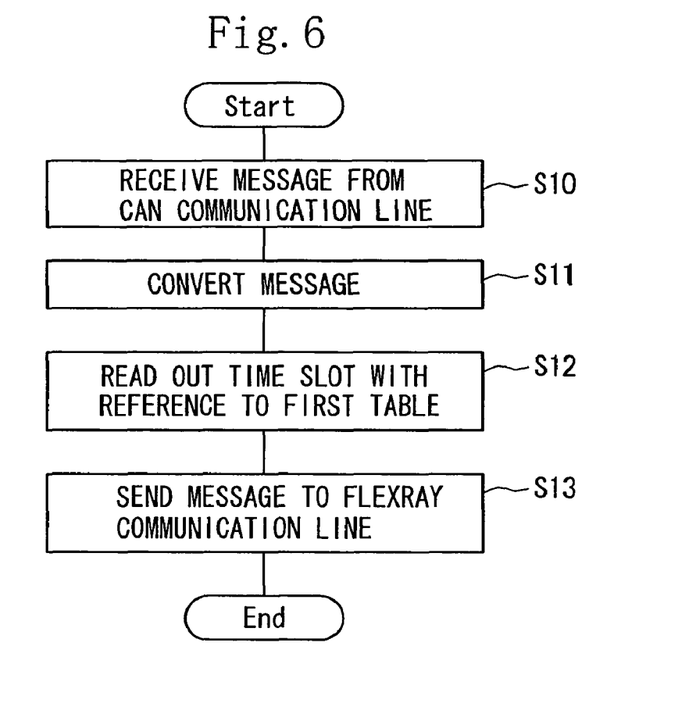
FIG. 6 is a flowchart showing the operation of the relay connection unit to be executed when the relay connection unit relays a message from a CAN communication line to a FlexRay communication line.

Initially the operation of the relay connection unit 20A of sending the second message m2 sent thereto from the ECU 13A to the FlexRay communication line 11 is shown in FIG. 6.

At step S10, the CAN communication section 21 of the relay connection unit 20A receives the second message m2 from the CAN communication line 12A and stores the second message m2 at the CAN buffer section 22.

The processing section 23 periodically monitors whether the second message m2 having an ID to be relayed is stored at the CAN buffer section 22. If the ID is stored at the CAN buffer section 22, the processing section 23 reads out the second message m2 from the CAN buffer section 22.

At step S11, the processing section 23 converts the second message m2 to the first message m1. The processing section 23 treats the data field 44 of the second message m2 as the payload segment 47 of the first message m1 and attaches the header segment 46 to the payload segment 47 to obtain the first message m1. The processing section 23 stores the first message m1 converted from the second message m2 at the FlexRay buffer section 25.

At step S12, with reference to the first storage table T1, the processing section 23 reads out the time slot TS at which the first message m1 converted from the second message m2 is sent. Supposing that the ID of the second message m2 received from the CAN communication line 12A is three, with reference to the first storage table T1 shown in FIG. 5(A), the processing section 23 reads out that the first message m1 converted from the second message m2 is sent at the time slot TS number 5 of the first period and the fourth period.

At step S13, the FlexRay communication section 26 periodically monitors whether the first message m1 is stored at the FlexRay buffer section 25. If the first message m1 is stored at the FlexRay buffer section 25, when the timing of the time slot TS read out at step S14 comes, the FlexRay communication section 26 reads out the first message m1 from the FlexRay buffer section 25 and sends the first message m1 to the FlexRay communication line 11.

Figure 8:
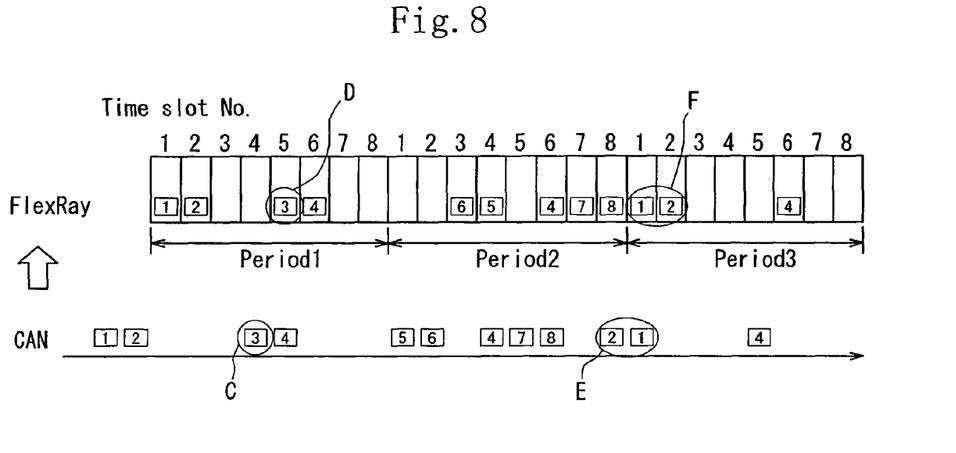
FIG. 8 is an explanatory view of a timing when the message is relayed from the CAN communication line to the FlexRay communication line.

That is, when the CAN communication section 21 of the relay connection unit 20A receives the second message m2 having the ID3 sent from the CAN communication line 12A at a portion C of FIG. 8, of the time slot TS number 5 of the first period and the fourth period read out from the first storage table T1, the first message m1 converted from the second message m2 having the ID3 is sent to the FlexRay communication line 11 at the time slot TS number 5 of the first period which is the closest sending timing shown at a portion D of FIG. 8.

As shown at portions E and F of FIG. 8, even if the order of receiving the second messages m2 having the ID2 and ID1 respectively from the CAN communication line 12A are replaced with the order of sending the first messages m1 to the FlexRay communication line 11, the first messages m1 are sent to the FlexRay communication line 11 in an order based on the first storage table T1 because in sending the first messages m1 to the FlexRay communication line 11, the time slot TS is set in the first storage table T1 for each ID.

Figure 7:
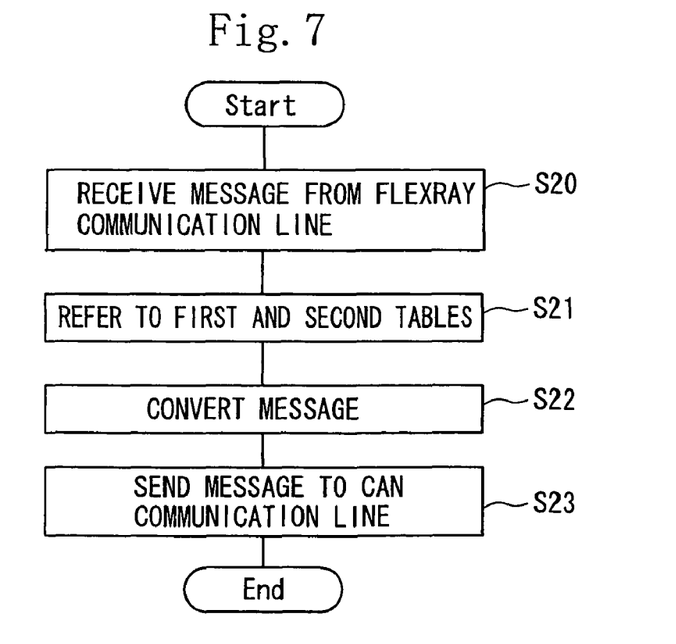
FIG. 7 is a flowchart showing the operation of the relay connection unit to be executed when the relay connection unit relays a message from the FlexRay communication line to the CAN communication line.

The operation of the relay connection unit 20B of relaying the first message m1 received thereby to the CAN communication line 12B is described below with reference to FIG. 7.

At step S20, the FlexRay communication section 26 of the relay connection unit 20B receives the first message m1 from the FlexRay communication line 11 and stores the first message m1 at the FlexRay buffer section 25.

The processing section 23 periodically monitors whether the first message m1 is stored at the FlexRay buffer section 25. If the first message m1 is stored at the FlexRay buffer section 25, the processing section 23 reads out the first message m1 from the FlexRay buffer section 25.

At step S21, with reference to the first storage table T1, the processing section 23 reads out the ID from the time slot TS at which the first message m1 is received and the period. With reference to the second storage table T2, the processing section 23 reads out the data length corresponding to the ID and the transmission period.

For example, because the first message m1 is received at the time slot TS number 5 of the first period, the processing section 23 reads out that the ID corresponding to the first message m1 is three with reference to the first storage table T1 of FIG. 5(A). With reference to the second storage table T2 shown in FIG. 5(B), the processing section 23 reads out that the data length corresponding to ID3 is eight and that the transmission period is three.

At step S22, the processing section 23 converts the first message m1 to the second message m2. The processing section 23 treats the payload segment 47 of the first message m1 as the data field 44 of the second message m2 and adds the arbitration field 42 and the control field 43 to the data field 44 of the second message m2. The processing section 23 writes the ID to the arbitration field 42 and writes the data length to the control field 43 to obtain the frame of the second message m2. The processing section 23 stores the second message m2 at the CAN buffer section 22.

At step S23, the CAN communication section 21 reads out the second message m2 from the CAN buffer section 22 at the transmission period read out from the second storage table T2 and sends the second message m2 to the CAN communication line 12B.

In the above-described construction, one second message m2 received from the CAN communication line 12 is converted to one first message m1, and the first message m1 is sent to the FlexRay communication line 11 at the time slot TS predetermined by the first storage table T1. Therefore it is possible to strictly observe the transmission period and prevent a relay time period from fluctuating.

By using the second storage table T2, it is possible to send the second message m2 to the CAN communication line 12 by converting the first message m1 to the second message m2.

The present invention is not limited to the above-described embodiments, but includes various forms within the scope of the claim of the present invention.

What is claimed is:

1. A relay connection unit, mounted on a vehicle, which is connected to a first communication line configured to communicate a first message by using a first communication protocol configured to communicate a message at time-divided time slots and a second communication line configured to communicate a second message by using a second communication protocol configured to communicate a message by attaching an ID (identifier) to said second message, said relay connection unit converting said communication protocols to each other to relay said first message and said second message, said relay connection unit comprising a first storage table in which said ID of said second message is assigned to each of said time-divided time slots configured to communicate said first message, a processing section configured to convert said second message received from said second communication line to said first message and sending said first message converted from said second message to said first communication line at said time slots assigned in said first storage table, a frame of said first message has a header segment and a payload segment showing a content of said first message, a frame of said second message has a data field showing a content of said second message, an arbitration field showing said ID thereof, and a control field showing a data length of said data field, and in executing communication by converting said second message to said first message, said processing section treats said data field of said second message as said payload segment of said first message and does not include said arbitration field of said second message and said control field thereof in said first message.

2. The relay connection unit mounted on a vehicle according to claim 1, further comprising a second storage table configured to convert said first message to said second message;

wherein said second storage table stores said data length and a period of transmission of said second message to said second communication line at each of said time slots of said first message, and said processing section converts said first message received from said first communication line by using said second storage table, and sends said second message converted from said first message to said second communication line, based on said transmission period shown in said second storage table.

3. The relay connection unit mounted on a vehicle according to claim 1, wherein in executing communication by converting said first message to said second message, said processing section treats said payload segment of said first message as said data field of the second message, writes said ID of said second message read out from said first storage table to said arbitration field of said second message, and writes said data length read out from said second storage table to said control field.

4. The relay connection unit mounted on a vehicle according to claim 1, wherein said communication protocol of said first communication line is FlexRay; and said communication protocol of said second communication line is CAN.

5. The relay connection unit mounted on a vehicle according to claim 1, wherein one or a plurality of ECUs are connected to each of said first communication line and said second communication line; and transmission of said first message and said second message is relayed among said ECUs.

* * * * *